(12) United States Patent
Seto

(10) Patent No.: US 11,313,766 B2
(45) Date of Patent: Apr. 26, 2022

(54) PEDESTAL FOR CHASSIS DYNAMOMETER

(71) Applicant: TOYO DENKI SEIZO KABUSHIKI KAISHA, Tokyo (JP)

(72) Inventor: Hodaka Seto, Kanagawa (JP)

(73) Assignee: TOYO DENKI SEIZO KABUSHIKI KAISHA, Tokyo (JP)

( * ) Notice: Subject to any disclaimer, the term of this patent is extended or adjusted under 35 U.S.C. 154(b) by 65 days.

(21) Appl. No.: 16/768,957

(22) PCT Filed: May 10, 2018

(86) PCT No.: PCT/JP2018/018072
§ 371 (c)(1),
(2) Date: Jun. 2, 2020

(87) PCT Pub. No.: WO2019/215864
PCT Pub. Date: Nov. 14, 2019

(65) Prior Publication Data
US 2021/0215573 A1   Jul. 15, 2021

(51) Int. Cl.
*G01M 17/007* (2006.01)

(52) U.S. Cl.
CPC ................. *G01M 17/007* (2013.01)

(58) Field of Classification Search
CPC .... G01M 7/00; G01M 17/04; G01M 17/0078; G01M 17/0074
See application file for complete search history.

(56) References Cited

U.S. PATENT DOCUMENTS

| | | | | |
|---|---|---|---|---|
| 3,815,404 A * | 6/1974 | Brisard | ................. | G01M 17/04 73/11.08 |
| 3,827,289 A * | 8/1974 | Borg | ..................... | G01M 17/06 73/669 |
| 4,199,979 A * | 4/1980 | Herr, Jr. | .................... | F16D 1/10 73/116.05 |
| 4,466,294 A * | 8/1984 | Bennington | ........ | G01M 15/044 73/116.05 |

(Continued)

FOREIGN PATENT DOCUMENTS

| | | |
|---|---|---|
| JP | 3-048514 Y2 | 10/1991 |
| JP | 5-058129 B2 | 8/1993 |

(Continued)

OTHER PUBLICATIONS

International Search Report for PCT Patent App. No. PCT/JP2018/018072 (dated Jul. 31, 2018) with English language translation.

*Primary Examiner* — Tran M. Tran
(74) *Attorney, Agent, or Firm* — Cermak Nakajima & McGowan LLP; Tomoko Nakajima

(57) ABSTRACT

In the chassis dynamometer apparatus, a pedestal contains a mounting frame on which a load motor is mounted, and a base under the mounting frame. Provided that a longitudinal direction of a vehicle is an x-axis direction and a width direction of the vehicle is a y-axis direction, a first movable mount(s) slidable in one side of the x-axis or y-axis direction, a second movable stand slidable in the other side of the x-axis or y-axis direction, and a spherical joint tiltable and rotatable in an arbitrary direction are connected in series between the mounting frame and the base.

6 Claims, 5 Drawing Sheets

(56) References Cited

U.S. PATENT DOCUMENTS

| | | | | |
|---|---|---|---|---|
| 4,511,112 A * | 4/1985 | Ruehle | ............... | F16M 5/00 248/544 |
| 4,635,472 A * | 1/1987 | Scourtes | ............ | G01M 17/0072 73/116.06 |
| 4,669,318 A | 6/1987 | Angström | | |
| 4,753,110 A * | 6/1988 | Burchett | ............ | G01L 5/1627 73/146 |
| 4,753,116 A * | 6/1988 | Burchett | ............ | G01M 17/0072 310/74 |
| 4,862,737 A * | 9/1989 | Langer | ............ | G01M 17/007 73/116.07 |
| 5,111,685 A * | 5/1992 | Langer | ............ | G01M 17/0074 73/118.01 |
| 5,323,644 A | 6/1994 | Schaefer | | |
| 5,633,464 A * | 5/1997 | Haeg | ............ | G01M 13/027 73/669 |
| 5,944,615 A * | 8/1999 | Lee | ............ | A63B 69/3652 473/279 |
| 5,986,545 A * | 11/1999 | Sanada | ............ | G01M 17/00 340/407.1 |
| 6,006,611 A * | 12/1999 | Galvin | ............ | G01L 3/242 73/862.16 |
| 6,044,696 A * | 4/2000 | Spencer-Smith | ... | G01M 17/007 73/116.06 |
| 6,343,504 B1 * | 2/2002 | Shultz | ............ | G01M 13/02 73/115.02 |
| 6,345,226 B1 * | 2/2002 | Koga | ............ | B60T 8/3215 477/44 |
| 6,427,528 B1 * | 8/2002 | Yamakado | ............ | G01M 17/0072 73/121 |
| 6,820,472 B2 * | 11/2004 | Ranchin | ............ | G01M 13/025 73/115.02 |
| 7,058,488 B2 * | 6/2006 | Kemp | ............ | G01M 17/007 701/29.1 |
| 7,152,463 B2 * | 12/2006 | Bond | ............ | G01M 17/0076 73/116.06 |
| 7,316,158 B2 * | 1/2008 | Boeck | ............ | B66F 7/16 254/3 C |
| 7,380,434 B2 * | 6/2008 | Schmitt | ............ | F16M 11/14 73/12.01 |
| 7,392,693 B2 * | 7/2008 | Wimmer | ............ | G01M 17/06 73/123 |
| 7,461,556 B2 * | 12/2008 | Hamilton | ............ | G01M 7/00 73/117.03 |
| 7,540,195 B2 * | 6/2009 | Nelsen | ............ | G01M 7/022 73/666 |
| 7,921,712 B1 * | 4/2011 | Rindler | ............ | G01M 13/02 73/116.06 |
| 8,037,743 B2 * | 10/2011 | Ichige | ............ | G01M 17/0072 73/116.05 |
| 8,186,206 B2 * | 5/2012 | Barnes | ............ | G01M 15/02 73/116.05 |
| 8,387,450 B2 * | 3/2013 | Ichige | ............ | G01M 17/0072 73/116.06 |
| 8,418,541 B2 * | 4/2013 | Kirkpatrick | ....... | G01M 17/0074 73/116.05 |
| 8,505,373 B2 * | 8/2013 | Goertz | ............ | G01M 1/10 73/116.01 |
| 8,505,374 B1 * | 8/2013 | Arseneau | ............ | G01L 3/24 73/116.05 |
| 8,844,345 B1 * | 9/2014 | Southward | ............ | G01L 25/00 73/117.03 |
| 8,966,987 B2 * | 3/2015 | Clusserath | ........ | G01M 17/0074 73/669 |
| 9,038,798 B2 * | 5/2015 | Sakai | ............ | F16D 11/14 192/69.9 |
| 9,046,444 B2 * | 6/2015 | Wakazono | ............ | G01M 17/021 |
| 9,109,973 B2 * | 8/2015 | Inhoff | ............ | B66F 9/148 |
| 9,442,044 B2 * | 9/2016 | Tagami | ............ | G01M 17/06 |
| 9,645,035 B1 * | 5/2017 | Southward | ............ | G01L 1/00 |
| 9,752,961 B2 * | 9/2017 | Barnes | ............ | G01M 17/0074 |
| 9,841,351 B2 * | 12/2017 | Reiter | ............ | G01M 13/025 |
| 9,933,332 B2 * | 4/2018 | Haciomeroglu | ............ | G01M 15/02 |
| 10,024,745 B1 * | 7/2018 | Luo | ............ | G01M 17/06 |
| 10,768,073 B2 * | 9/2020 | Maschmeyer | ....... | G01M 15/042 |
| 10,809,301 B2 * | 10/2020 | Humphrey | ............ | F16H 7/023 |
| 11,009,428 B2 * | 5/2021 | Hell | ............ | F16H 57/025 |
| 2008/0078250 A1 * | 4/2008 | Nelsen | ............ | G01M 17/007 73/666 |
| 2010/0107750 A1 | 5/2010 | Engström | | |
| 2011/0303000 A1 * | 12/2011 | Engstrom | ......... | G01M 17/0074 73/116.06 |

FOREIGN PATENT DOCUMENTS

| | | |
|---|---|---|
| JP | 3073110 B2 | 8/2000 |
| JP | 2004-020401 A | 1/2004 |
| WO | WO85/004475 A1 | 10/1985 |

* cited by examiner

PEDESTAL FOR CHASSIS DYNAMOMETER

This application is a national phase entry under 35 U.S.C. § 371 of PCT Patent Application No. PCT/JP2018/018072, filed on May 10, 2018, which is incorporated by reference.

TECHNICAL FIELD

The present invention relates to a chassis dynamometer apparatus in which each of load motors connected with each of load wheel connecting portions of a vehicle is mounted on a pedestal.

BACKGROUND ART

Conventionally, there has been known a chassis dynamometer apparatus which carries out a most appropriate centering of each of rotor shafts by adjusting pedestal in order to suppress blurring of each of wheel centers when the rotor shaft of each of load motors is connected with each of load wheels of a vehicle. See a following first reference.

In the case where each of load motors is connected with each of wheel connecting portions, it is necessary to be able to change postures of each of the load motors under consideration of varied postures of each of load wheels during traveling of the vehicle on a path as well as to connect each of the load motors with each of the load wheel connecting portions in conditions that each of the load motors is inclined at the same angles as caster and camber angles of each of the load wheels. For example, it is necessary to consider the postures of the vehicle when the vehicle turns right or left according to operations of a steering wheel. Thus, appropriate changes are required in a performance test of the vehicle so as to be able to realize the same postures of each of the load motors as the ones of each of the load wheels. However, the chassis dynamometer apparatus disclosed in the first reference cannot meet such the requirements as above-mentioned.

REFERENCE(S)

Patent Document(S)

The first reference: Japanese Patent Publication No. 2004-20401

SUMMARY OF INVENTION

Technical Problems

The present invention was made in the circumstances above-mentioned and has an object to solve such the problems as above-mentioned by providing a chassis dynamometer apparatus which is able to synchronize postures of each of load motors, which is connected with each of load wheel connecting portions of a vehicle and is mounted on a pedestal, with the ones of each of load wheels of a vehicle.

Solution to Problems

To solve the problems above-mentioned, one of the aspects of the invention provides a chassis dynamometer apparatus in which each of load motors connected with each of load wheel connecting portions of a vehicle is mounted on a pedestal, comprising; provided that a longitudinal direction of a vehicle is an x-axis direction and a width direction of the vehicle is a y-axis direction, the pedestal containing a mounting frame on which each of the load motors is mounted and a base arranged under the mounting frame; a first movable mount(s) slidable in one direction of the x-axis or y-axis direction; a second movable mount slidable in the other direction of the x-axis or y-axis direction; and a spherical joint tiltable and rotatable in an arbitrary direction, wherein the first movable mount(s), the second movable mount, and the spherical joint are connected in series between the mounting frame and the base.

According to one of the aspects of the invention, sliding in the x-axis and y-axis directions of each of the load motors mounted on the pedestal, tilting, and rotation in the arbitrary direction are free by the first movable mount(s), the second movable mount, and the spherical joint which are connected in series between the mounting frame and the base included in the pedestal. This realizes to synchronize postures of each of the load motors with the ones of each of the load wheels of the vehicle.

Another aspect of the invention provides the chassis dynamometer apparatus, wherein a pair of the first movable mounts disposed at a distance in the x-axis direction are mounted on the base, the second movable mount is connected with the pair of the first movable mounts and bridges the pair of the first movable mounts, and the spherical joint is connected with the second movable mount between the pair of the first movable mounts and protrudes downward from the second movable mount, wherein the spherical joint contains an inner cylinder having a spherical outer face, a collar having a spherical inner face coming into contact with the spherical outer face of the inner cylinder and slidably supporting the inner cylinder inside, and an outer cylinder supporting the collar by fitting the collar inside and being fixed to a lower face of the second movable mount, and wherein a projection protruding downward from the mounting frame is fixed to the inner cylinder by fitting the inner cylinder inside through a window hole opened at the second movable mount According to another aspect of the invention, the spherical joint is disposed within a height size of a lower face of the second movable mount bridging the pair of the first movable mounts and a height size of the pedestal is shorten because the spherical joint is connected with the second movable mount at the lower face of the second movable mount between the pair of the first movable mounts.

Another aspect of the invention provides the chassis dynamometer apparatus, wherein each of the load motor contains a case having a peripheral wall, an end wall, a hollow surrounded by the peripheral wall and the end wall, a stator fixed to an inner face of the peripheral wall of the case, and a rotor housed in the hollow of the case, which is rotatably arranged in an inside of the stator in a radial direction and is connectable with each of the load wheel connecting portions of the vehicle, wherein provided an outer side of the width direction of the vehicle is an outer side of the y-axis direction and an inner side of the width direction of the vehicle is an inner side of the y-axis direction, the peripheral wall of the case extends in the y-axis direction, the end wall of the case is arranged at an end of the outer side of the y-axis direction, the case is insertable into a wheel housing of the vehicle from the outer side of the y-axis direction when each of the load motor is provided with the vehicle, and a brake disk and a brake caliper of the vehicle are insertable in an inside of the hollow of the case, wherein the rotor contains a rotor connecting portion connectable with each of the load wheel connecting portions of the vehicle, a rotor frame extending in an outer side of a radial direction of the rotor at a position apart from the brake caliper in a condition that the rotor connecting portion is connected with each of the load wheel connecting portions, a rotor peripheral wall extending in the inner side of the y-axis direction from a connecting portion at an end of the outer side in the radial direction of the rotor frame, and magnets fixed to the rotor peripheral wall, and wherein the brake caliper is inserted into a space positioned at the inner side of the radial direction of the rotor inner wall in a condition that the rotor connecting portion is connected with each of the load wheel connecting portions.

According to another aspect of the invention, a distance in the y-axis direction between the rotor frame and the brake caliper is shortened and therefore a distance in the y-axis direction from the rotor connecting portion to the end wall of the case is also shortened because the brake caliper is inserted into the space of the rotor peripheral wall at the inner side of the radial direction in the condition that the rotor connection portion is connected with each of the load wheel connecting portions. Accordingly, overhanging of the end wall of the case outward from the wheel housing of the vehicle is suppressed in the condition that the rotor connecting portion is connected with each of the load wheel connecting portions. Misdetection of the load motor by various sensors mounted on the vehicle is suppressed and malfunction of the vehicle based on the misdetection is able to be suppressed. Additionally, when the load wheels are turned right and left at a time of the performance test of the vehicle, a distance from each of the load wheel connecting portions to the end wall of the case is shortened and therefore a compact chassis dynamometer apparatus is promoted.

DESCRIPTION OF EMBODIMENTS

Figure 1:
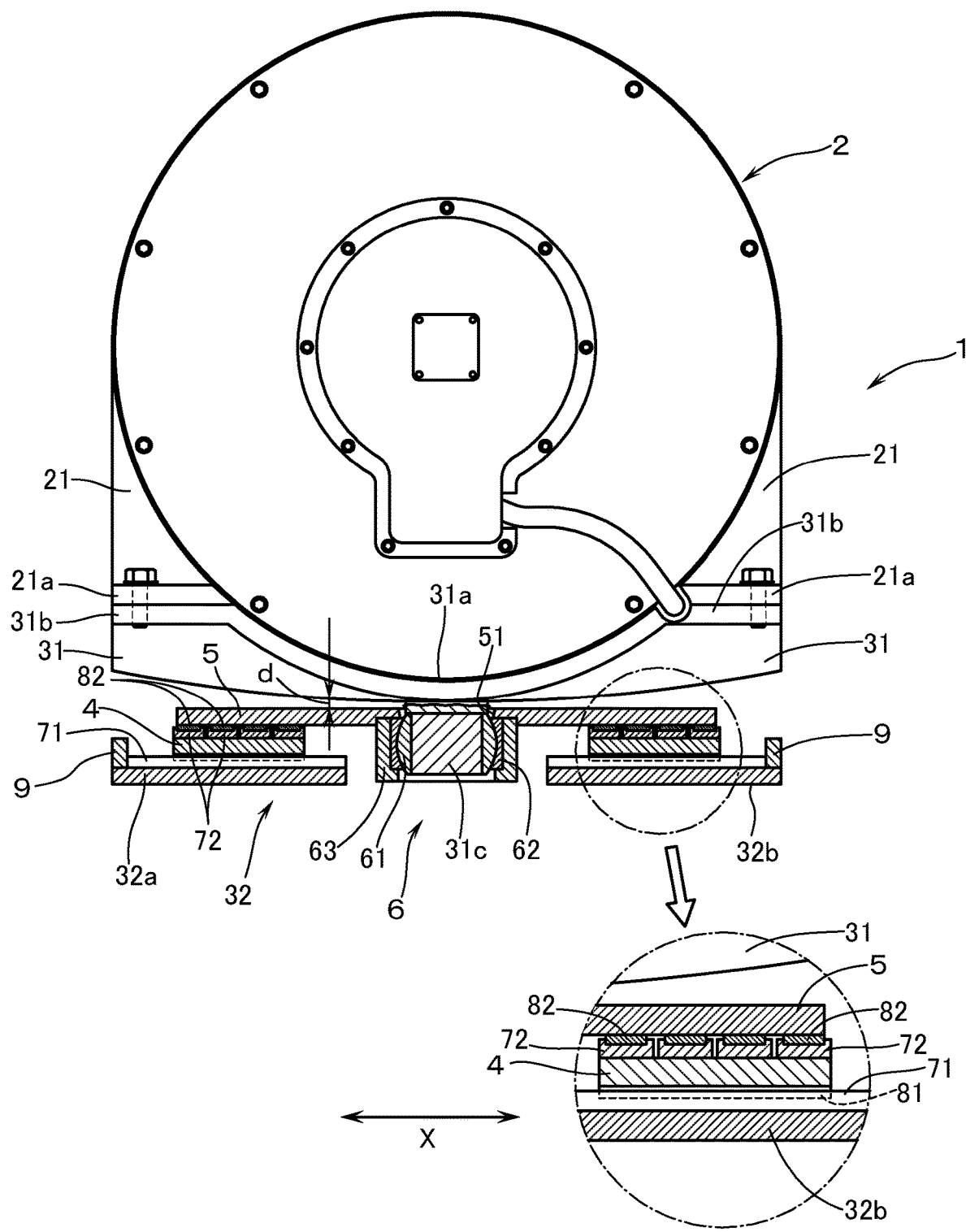
FIG. 1 is a side view of one of the embodiments of a chassis dynamometer apparatus as shown in a width direction of a vehicle. With respect to first movable mounts, a second movable mount, and a spherical joint, their cross sections in a vertical direction are shown.

Referring to FIGS. 1 to 4, one of the embodiments of a chassis dynamometer apparatus 1 is explained. A longitudinal direction of a vehicle is an x-axis direction and a width direction of the vehicle is a y-axis direction in the following explanations. The chassis dynamometer apparatus 1 contains a load motor 2 connectable with a load wheel connecting portion of the vehicle, and a pedestal 3 on which the load motor 2 is mounted. The pedestal 3 contains a mounting frame 31 on which the load motor 2 is mounted, and a base 32 arranged at a position lower than that of the mounting frame 31. The mounting frame 31 is a longitudinal member in the x-axis direction and has a concave portion 31a which has a concave inner peripheral face and is possible to be put on an outer peripheral face of a lower portion of the load motor 2, and a flange 31b disposed at both ends of one and the other sides of the x-axis direction, which extends outward in the x-axis direction from the concave portion 31a. The mounting frame 31 also has a projection 31c protruding downward. A connecting frame 21 is provided with the load motor 2 and has a flange 21a which is able to overlap with the flange 31b of the mounting frame 31. When the outer face of the lower portion of the load motor 2 is put on the inner face of the concave portion 31a, the flanges 31b and 21a of the mounting frame 31 and the connecting frame 21 are overlapped and the load motor 2 is fastened to the mounting frame 31 at the connecting frame 21 in such the overlapped condition as above-mentioned.

In the embodiment, the base 32 is divided into a first base 32a and a second base 32b and the first base 32a and the second base 32b are disposed at a distance in the x-axis direction. The base 32 is not necessarily divided as such and may be integrated. A first movable mount 4 slidable in the x-axis direction and a second movable mount 5 slidable in the y-axis direction, and a spherical joint are connected in series between the mounting frame 31 and the base 32. Specifically, two longitudinal rails 71 extending in the x-axis direction are fixed to one and the other side portions in the y-axis direction of each of the first base 32a and the second base 32b. Each of sliders 81 slidable in a longitudinal direction is arranged on each of the rails 71. A pair of the first movable mount 4 are arranged at a distance in the x-axis direction. Each of the first movable mount 4 is arranged by bridging four rails 71 in total fixed to each of the first base 32a and the second base 32b and is also fixed to the four sliders 81 in total. Therefore, each of the first movable mount 4 is slidable in the x-axis direction with regard to the first base 32a and the second base 32b. A stopper 9 is raised on each of one end portion of the x-axis direction of the first base 32a and the other stopper 9 is raised on the other end portion of the x-axis direction of the second base 32b. The stopper 9 raised on the first base 32a forms a sliding limit of one of the first movable mounts 4 in one side of the x-axis direction and the stopper 9 raised on the second base 32b forms a sliding limit of the other of the first movable mounts 4 in the other side of the x-axis-direction.

Additionally, in the embodiment, four longitudinal rails 72 extending in the y-axis direction are arranged abreast in the x-axis direction and are fixed to each of the first movable mounts 4. One of the sliders 82 is slidable arranged on each of the rails 72 in the direction of each of the rails 72. The second movable mount 5 is fixed to the eight sliders 82 in total and bridges the pair of the first movable mounts 4. In this manner, the second movable mount 5 is connected with the first movable mounts 4 and is slidable in the y-axis direction with regard to the first movable mounts 4. A same member is adaptable to the rails 71 and 72, and this is applicable to sliders 81 and 82. Arbitral structures of the member above-mentioned are adaptable. On the other hand, a window hole 51 pierces the second movable mount 5 at a position corresponding to a projection 31c of the mounting frame 31.

Further, in the embodiment, the spherical joint 6 is connected with the second movable mount 5 so as to protrude downward from the second movable mount 5 between the pair of the first movable mounts 4. Specifically, the spherical joint 6 contains an inner cylinder 61 having an outer spherical face, a collar 62 having a spherical inner surface coming into contact with the spherical outer surface of the inner cylinder 61 and slidably supporting the inner cylinder 61 in the collar 62, and an outer cylinder 63 supporting the collar 62 by fitting the collar 62 in the outer cylinder 63. Since the inner cylinder 61 is slidable in the collar 62 supported by the outer cylinder 63 in an arbitrary direction, the spherical joint 6 is tiltable and rotatable in an arbitrary direction. On the other hand, the outer cylinder 63 is fixed to a lower face of the second movable mount 5 and is positioned at an outside of a circumferential edge of the window whole 51. The projection 31c of the mounting frame 31 is engaged with an inside of the inner cylinder 61 through the window hole 51. A clearance d may be formed between the lower face of the mounting frame 31 and an upper face of the second movable mount 5 in a condition that the projection 31c is engaged with an inside of the inner cylinder 61. Although the clearance d is not particularly necessary in the case where both the lower face of the mounting frame 31 and the upper face of the second movable mount 5 are slidably curved, in the case of a planar second movable mount 5, there is a feasibility that the upper face of the second movable mount 5 comes into contact with the lower face of the mounting frame 31 and the contact of the upper face of the second movable mount 5 to the lower face of the mounting frame 31 may deteriorate tilting and rotation and lead to abrasion of both the lower face of the mounting frame 31 and the upper face of the second movable mount 5 during tilting or rotation of the mounting frame 31 by the spherical joint 6. The clearance d is advantageous to suppresses such the drawback as above-mentioned. The clearance d may be gradually increased at one and the other side of the x-axis direction or in y-axis direction as a boundary of the spherical joint 6.

Figure 2:
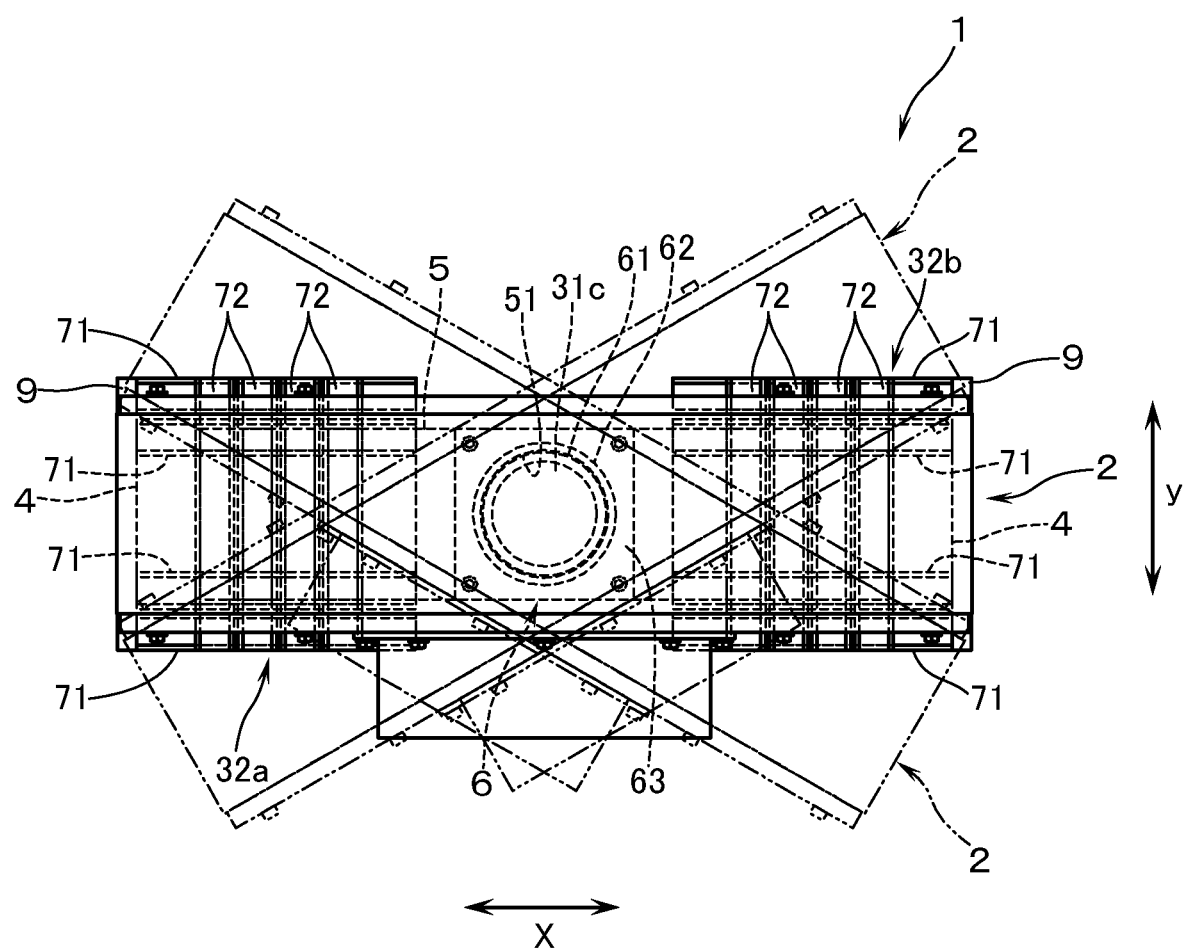
FIG. 2 is a plan view showing a rotation of the chassis dynamometer apparatus shown in FIG. 1.
Figure 3:
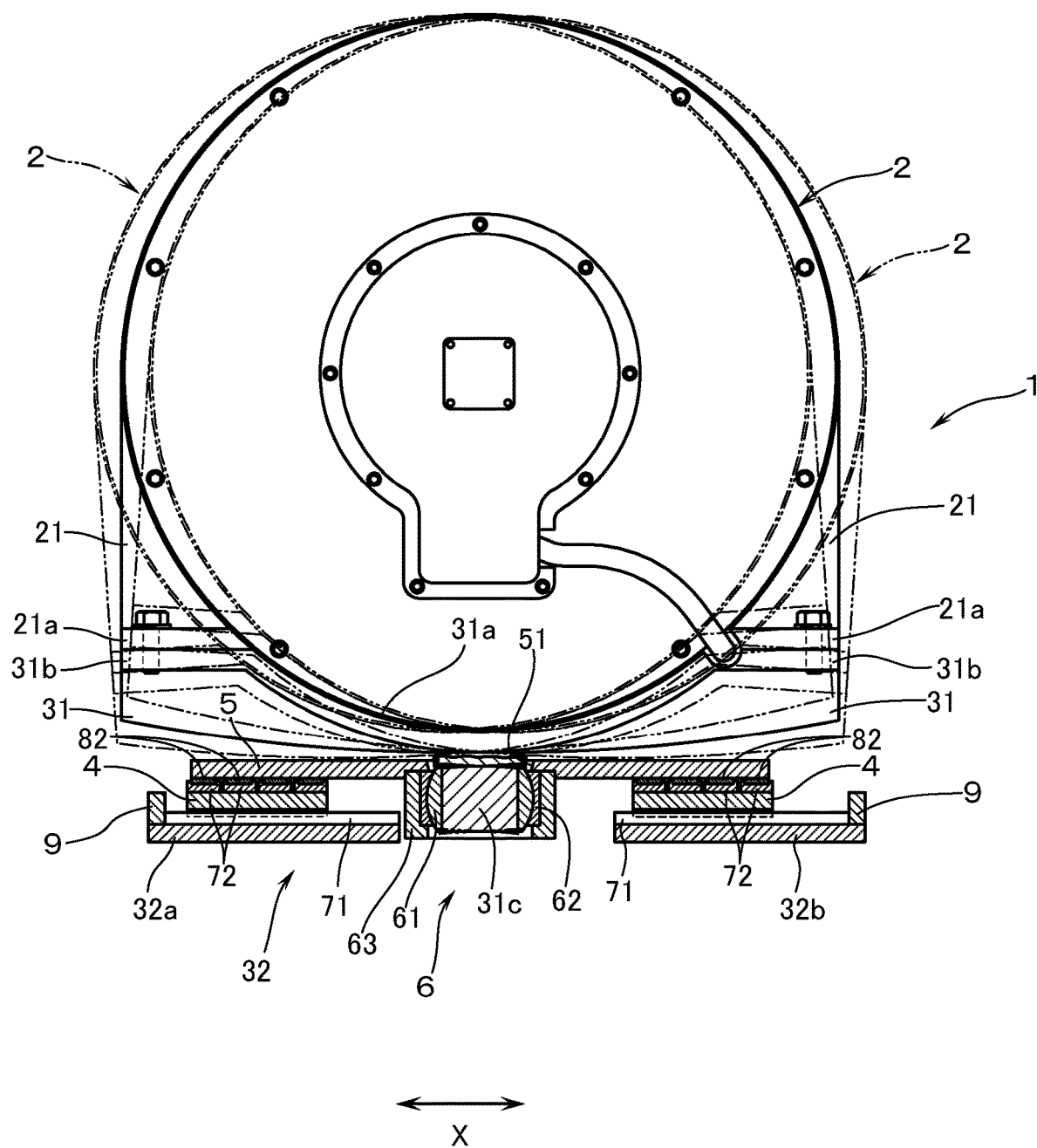
FIG. 3 is a side view of tilting of the chassis dynamometer apparatus in one and the other directions of a longitudinal direction of the vehicle, as shown in similar to FIG. 1.
Figure 4:
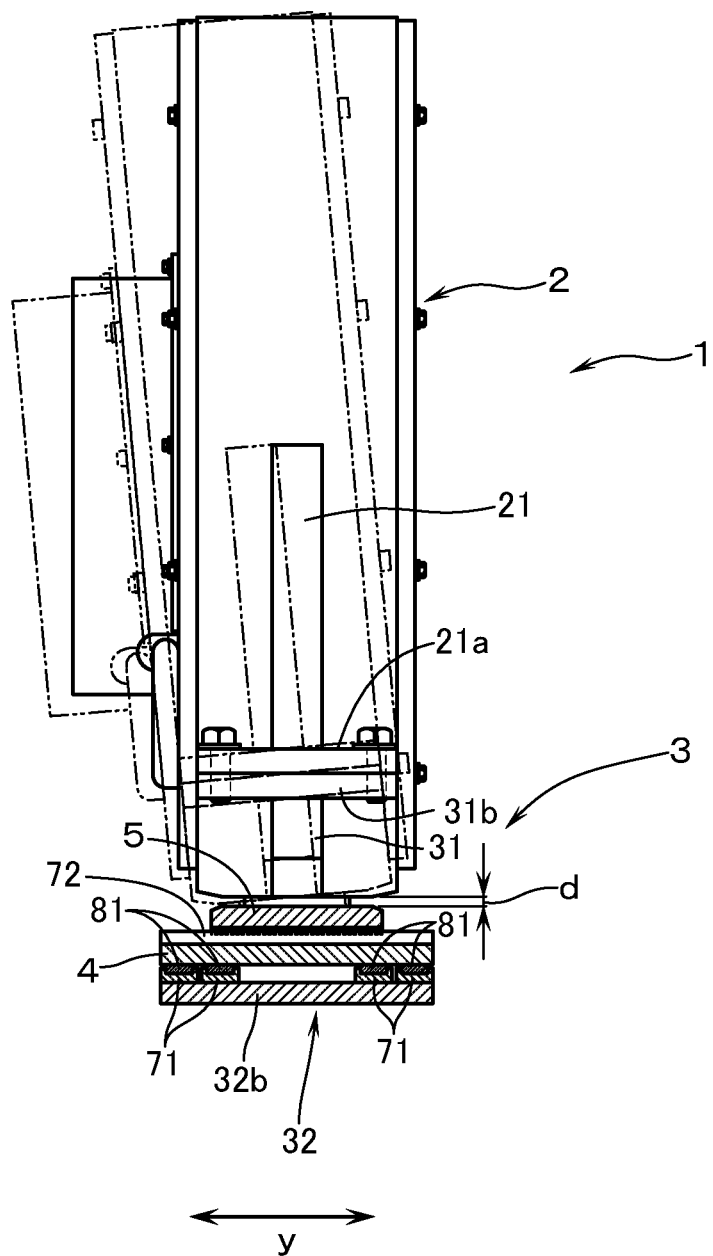
FIG. 4 is a rear view showing tilting of the chassis dynamometer apparatus in a width direction of the vehicle, as seen a rear side of the chassis dynamometer apparatus. With respect to the first movable mounts, the second movable mount, and the spherical joint, their cross sections in a vertical direction are shown.

As above-mentioned, in the embodiment, slides of the load motor 2 mounted on the pedestal 3 in the x-axis and y-axis directions, and tilting and rotation of the load motor 2 are possible and therefore postures of the load motor 2 are synchronized with the ones of load wheels of the vehicle by the first movable mounts 4, the second movable mount 5, and the spherical joint 6 which are connected in series between the mounting frame 31 and the base 32 of the pedestal 3. For example, as shown in FIG. 2, the postures of the load motor 2 is synchronized with the ones of the load wheels under conditions that the vehicle turns right and left according to rotational operations of a steering wheel. Further, as shown in FIGS. 3 and 4, the load motors 2 are connected with the load wheel connecting portions of the vehicle in a condition that the load motors 2 are inclined at the same angles as caster and camber angles of the load wheels. Additionally, in the embodiment, since the spherical joint 6 is connected with the lower face of the second movable mount 5 between the pair of the first movable mounts 4, the spherical joint 6 is arranged within a height size from the lower face of the second movable mount 5 bridging the pair of the first movable mounts 4 to the upper face of the base 32 and therefore a height size of the pedestal 3 is shortened.

Figure 5:
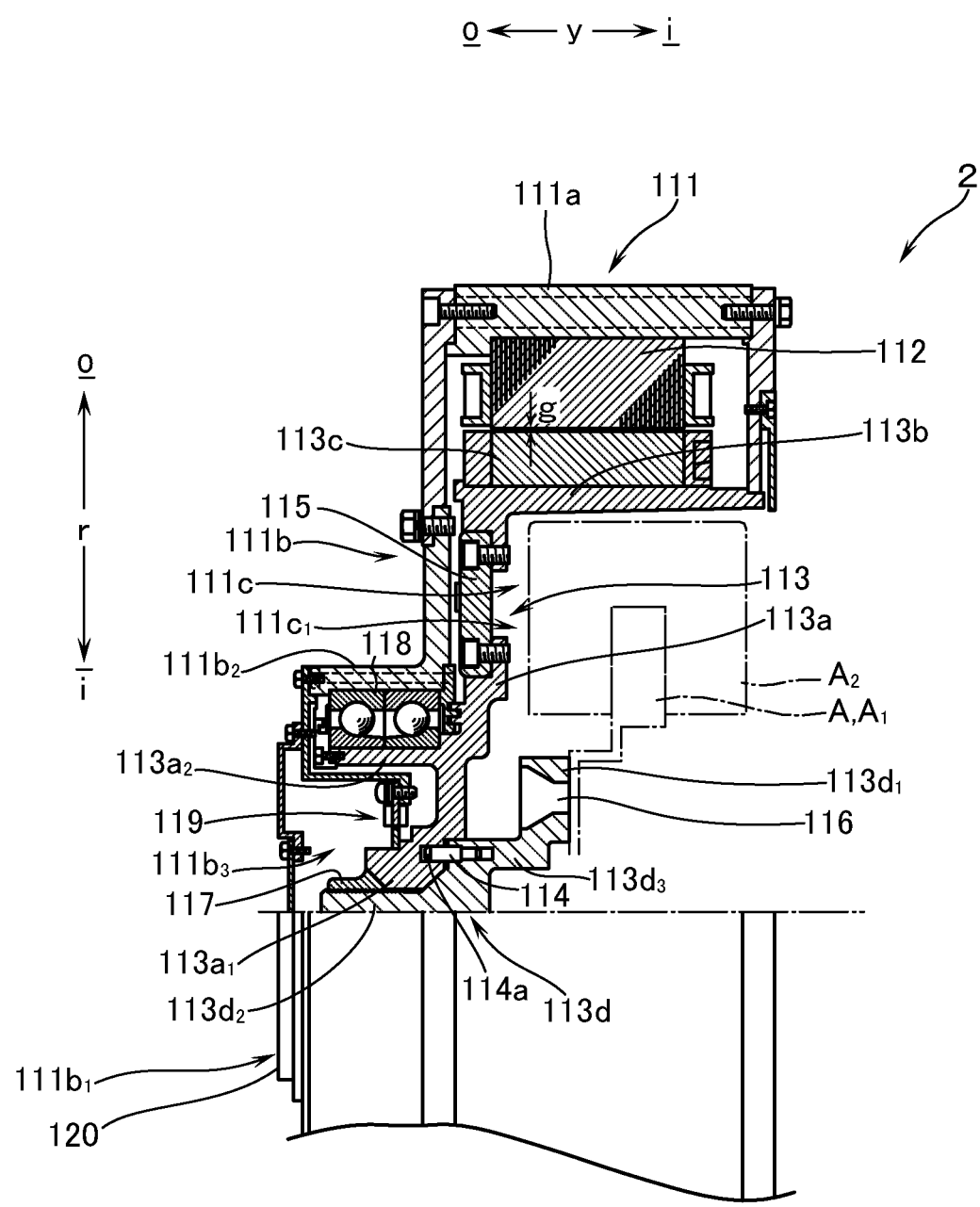
FIG. 5 is a partial cross section of the chassis dynamometer apparatus shown in FIG. 1.

Referring to FIG. 5, an embodiment of the load motor 2 is explained. The load motor 2 is attachable to each of load wheel connecting portions provided with an end of an axle of the vehicle. The load wheel connecting portion A contains a break disk $A_1$ and a wheel hub and is varied by structures of various vehicle suspensions. The load motor 2 contains a case 111, a stator 112, and a rotor 113.

With regard to the load motor 2, a radial direction is "r", an outer side and an inner side of the radial direction is "o" and "i", respectively, in the following explanations. Also, an outer side and an inner side of the y-axis direction which is a width direction of the vehicle is "o" and "i", respectively.

The case 111 has a peripheral wall 111a, an end wall 111b, and a hollow 111c surrounded by the peripheral wall 111a and the end wall 111b. The peripheral wall 111a has a cylinder-like shape extending in the y-axis. The end wall 111b is fastened to an outer side end of the y-axis direction of the peripheral 111a. The stator 112 is fixed to an inner face of the peripheral wall 111a of the case 111. A coil is wound around the stator 112 and supplies an electric power from the chassis dynamometer apparatus 1 shown in FIG. 1. The case 111 is insertable to a wheel housing from the outer side o of the y-axis direction when the load motor 2 is provided with the vehicle, and when inserting the case 111, the brake disk $A_1$ and a brake caliper $A_2$ contained the load wheel connecting portion A of the vehicle are inserted in the hollow 111c.

The rotor 113 is housed in the hollow 111c of the case 111 and is rotatably arranged at the inner side i of the radial direction r of the stator 112. The rotor 113 contains a rotor frame 113a, a rotor peripheral wall 113b, magnets 113c, and a shaft member 113d. The rotor frame 113a extends in the outer side o of the radial direction r. An inside end of the radial direction r of the rotor frame 113a is bent to the outer side o of the y-axis direction and has a projection $113a_1$ protruding to the outer side o of the radial direction r. A plurality of pin holes 114a in each of which a pin 114 is insertable are opened at a portion of the inner side i of the y-axis direction of an inner end of the rotor frame 113a in the radial direction r. A torque sensor 115 is arranged at the rotor frame 113a. The rotor peripheral wall 113b is connected with an outer side end of the rotor frame 113a in the radial direction r and has a cylindrical shape extending from a connecting portion of the rotor peripheral wall 113 with an outer side end of the rotor frame 113a to the inner side i in the y-axis direction. The magnets 113c are disposed at the rotor peripheral wall 113c with a prescribed interval in a peripheral direction of the rotor peripheral wall 113b. An outer face of each of the magnets 113c in the radial direction r is apart from an inner end face of the stator 112 in the radial direction r at a prescribed gap g. A cylinder shaft 113a2 protrudes to the outer side o of the y-axis direction and is disposed at a middle portion between an inner end and an outer end of the rotor frame 113a in the radial direction r. The cylinder shaft 113a2 is integrated with the rotor frame 113a.

The shaft member 113d is separated from the rotor frame 113a. The shaft member 113d has a rotor connecting portion 113d1 at an inner side i of the y-axis direction and the rotor frame 113a is connected with the shaft member 113d at an inner side end of the rotor frame 113a in the radial direction r. Specifically, the shaft member 113d is a member extending in the y-axis direction and contains a columnar rotor frame fixing portion $113d_2$ and a cylindrical rotor frame fixing and positioning portion 113d3. Thread grooves are provided around an outer face of a portion from an outer side end to a middle portion of the rotor frame fixing portion $113d_2$ in the y-axis direction. An inner end of the rotor frame fixing portion $113d_2$ in the y-axis direction is bent to the outer side o of the radial direction r and the rotor frame fixing and positioning portion $113d_3$ is formed by bending the rotor frame fixing portion $113d_2$ to an inner side i of the y-axis direction. A plurality of pins 114 protruding in the outer side o of the y-axis direction are concentrically embedded in the rotor frame fixing and positioning portion $113d_3$ at a prescribed distance. The rotor connecting portion 113d1 is formed by bending an inner side end of the rotor frame fixing and positioning portion $113d_3$ in the y-axis direction. A plurality of inserting holes 116 piercing the rotor connecting portion $113d_1$ are opened at the rotor connecting portion $113d_1$. The inserting holes 116 are concentrically disposed at a prescribed distance. Each of the insertion holes 116 is also opposed to each of a plurality of thread holes (not shown) opened at the load wheel connecting portion A containing the brake disk $A_1$ in the y-axis direction with a relationship of one by one. Accordingly, the shaft member 113d is connected with the load wheel connecting portion A by inserting a bolt from each of inserting holes 116 and by screwing the bolt with the thread holes as above-mentioned.

As above-mentioned, a fixing position of the rotor frame 113a is spontaneously decided by fitting the projection $113a_1$ on the rotor frame fixing portion $113d_2$ and inserting pins 114 into the pin holes 114a in a condition that the shaft member 113d is connected with the load wheel connecting portion A. When a nut 117 is screwed from the outer side end of the rotor frame fixing portion $113d_2$ to inner side i in the y-axis direction, the projection $113a_1$ is fastened between the nut 117 and the rotor frame fixing and positioning portion $113d_2$ and the rotor frame 113a is connected with the shaft member 113d at an inner side end of the rotor frame 113a in the radial direction r. As a result, the rotor 113 is rotatable together with the load wheel connecting portion A. In this condition, the brake caliper $A_2$ is inserted into a space $111c_1$ positioned at the inner side i of the radial direction r of the rotor peripheral wall 113b in the hollow 111c of the case 111 and the rotor frame 113a extends in the outer side o of the radial direction r at an outer side position apart from the break caliper $A_2$. Accordingly, a distance in the y-axis direction from the rotor connecting portion $113d_1$ to the end wall 111b of the case 111 is shorten and overhanging of the end wall 111b of the case 111 outward from the wheel housing of the vehicle is suppressed in the condition that the rotor connecting portion $113d_1$ is connected with the load wheel connecting portion A of the vehicle. Therefore, misdetection of the load motor 2 by various sensors mounted on the vehicle is suppressed and malfunction of the vehicle based on the misdetection is able to be suppressed. A highly reliable vehicle performance test is realized. A compact size of the chassis dynamometer apparatus 1 is promoted by the short distance from the load wheel connecting portion A to the end wall 111b of the case 111 when the load wheels are tuned right and left at a time of the vehicle performance test.

A rotational supporting portion $111b_1$ is disposed at a center of the end wall 111b in the load motor 2. A corresponding portion of the end wall 111b to the rotational supporting portion $111b_1$ is bent to the outer side o of the y-axis direction and a cylindrical body $111b_2$ is formed. Bearings 118 in an inner ring rotation manner are arranged to an inner face of the body $111b_2$. The cylinder shaft $113a_2$ of the rotor frame 113a protrudes to the outer side o of the y-axis direction at the body $111b_2$ and the bearings 118 are interposed between the cylinder shaft $113a_2$ and the body $111b_2$. A portion between the inner side end of the rotor frame 113a and the cylinder shaft $113a_2$ is hollow and a rotation sensor 119 containing a magnetic pickup and a sensor gear is housed in a space $111b_3$. An inner portion of the rotational supporting portion $111b_1$ is concealed by a cover 120 fixed to the rotational supporting portion $111b_1$ from the outer side o of the y-axis direction. A whole or only some portion opposed to the nut 117 of the cover 120 may be detachable.

As above-mentioned, the load motor 2 is connected with the load wheel connecting portion A in place of the load wheel at a time of the vehicle performance test. The load motor 2 is able to be connected with each of two front wheels in a front wheel drive vehicle, each of two rear wheels in a rear wheel drive vehicle, or each of four wheels in all wheel drive vehicle.

An embodiment of the present invention is explained with reference to the drawings. However, the present invention is not restricted to the embodiment as above-mentioned. Though the first movable mounts 4 are slidable in the x-axis direction and the second movable mount 5 is slidable in the y-axis direction in the embodiment, the first movable mounts 4 may be slidable in the y-axis direction and the second movable mount 5 may be slidable in the x-axis direction. This modification is realized by changing the longitudinal directions of the rails 71 and 72 to the opposite direction. It is necessary to connect the first movable mount 4, the second movable mount 5, and the spherical joint 6 in series. Accordingly, when there is a size allowance in a vertical direction, for example, the first movable mount 4, the second movable mount 5, and the spherical joint 6 are connected in the vertical direction in series. Further, there is no sequence restriction in connection of the first movable mount 4, the second movable mount 5, and spherical joint 6. Furthermore, the structures of the load motor 2 and the load wheel connecting portion A of the vehicle are not particularly restricted. Various modifications including conventional structures are adaptable to the present invention.

EXPRESSION OF SYMBOLS

1 Chassis dynamometer apparatus
2 Load motor
3 Pedestal
31 Mounting frame
31c Projection
32 Base
4 First movable mount
5 Second movable mount
51 Window hole
6 Spherical joint
61 Inner cylinder
62 Collar
63 Outer cylinder
111 Case
111a Peripheral wall
111b End wall
111c Hollow
$111c_1$ Space
112 Stator
113 Rotor
113a Rotor frame
113b Rotor peripheral wall
113c Magnets
113d Shaft member
$113d_1$ Rotor connecting portion
A Load wheel connecting portion
$A_1$ Brake disk
$A_2$ Brake caliper
r Radial direction
o Outer side
i Inner side

I claim:
1. A chassis dynamometer apparatus, in which each of load motors are provided at a time of a vehicle performance test instead of each of load wheels and connected with each of load wheel connecting portions of a vehicle, comprising; provided that a longitudinal direction of a vehicle is an x-axis direction and a width direction of the vehicle is a y-axis direction, a pedestal on which each of the load motors is mounted, the pedestal containing a mounting frame on which each of the load motors is mounted and a base arranged under the mounting frame;

a first movable mount slidable in one direction of the x-axis or y-axis direction;

a second movable mount slidable in the other direction of the x-axis or y-axis direction; and a spherical joint tiltable and rotatable in an arbitrary direction and placed immediately/directly under the load motor, wherein the mounting frame is a longitudinal member in the x-axis direction and has a concave portion which has a concave inner peripheral face to be put on an outer peripheral face of a lower portion of the load motor, and a mounting frame flange extending outward to both ends from the concave portion in the x-axis direction, a connecting frame is provided with the load motor and has a connecting frame flange which overlaps with the mounting frame flange so that the load motor is fastened to the mounting frame at the connecting frame, the first movable mount, the second movable mount, and the spherical joint are connected in series between the mounting frame and the base.

2. The chassis dynamometer apparatus as claimed in claim 1, wherein the first movable mount comprises a pair of the movable mounts disposed at a distance in the x-axis direction are mounted on the base, the second movable mount is connected with the pair of the movable mounts and bridges the pair of the movable mounts, and the spherical joint is connected with the second movable mount between the pair of the movable mounts and protrudes downward from the second movable mount, wherein the spherical joint contains an inner cylinder having a spherical outer face, a collar having a spherical inner face coming into contact with the spherical outer face of the inner cylinder and slidably supporting the inner cylinder inside, and an outer cylinder supporting the collar by fitting the collar inside and being fixed to a lower face of the second movable mount, and wherein a projection protruding downward from the mounting frame is fixed to the inner cylinder by fitting the inner cylinder inside through a window hole opened at the second movable mount.

3. The chassis dynamometer apparatus as claimed in claim 1, the mounting frame is provided directly under each of the load motors.

4. A chassis dynamometer apparatus comprising:

load motors, wherein each of load motors is provided at a time of a vehicle performance test instead of each of load wheels and is connected with each of load wheel connecting portions of a vehicle and, provided that a longitudinal direction of a vehicle is an x-axis direction and a width direction of the vehicle is a y-axis direction;

a pedestal where each of load motors is mounted, the pedestal containing a mounting frame on which each of the load motors is mounted and a base arranged under the mounting frame;

a first movable mount slidable in one direction of the x-axis or y-axis direction;

a second movable mount slidable in the other direction of the x-axis or y-axis direction; and a spherical joint tiltable and rotatable in an arbitrary direction, the first movable mount, the second movable mount, and the spherical joint are connected along a stacking direction in between the mounting frame and the base, wherein each of the load motors contains a case having a peripheral wall, an end wall, a hollow surrounded by the peripheral wall and the end wall, a stator fixed to an inner face of the peripheral wall of the case, and a rotor housed in the hollow of the case, which is rotatably arranged in an inside of the stator in a radial direction and is connectable with each of the load wheel connecting portions of the vehicle, wherein provided an outer side of the width direction of the vehicle is an outer side of the y-axis direction and an inner side of the width direction of the vehicle is an inner side of the y-axis direction, the peripheral wall of the case extends in the y-axis direction, the end wall of the case is arranged at an end of the outer side of the y-axis direction, the case is insertable into a wheel housing of the vehicle from the outer side of the y-axis direction when each of the load motor is provided with the vehicle, and a brake disk and a brake caliper of the vehicle are insertable in an inside of the hollow of the case, wherein the rotor contains a rotor connecting portion connectable with each of the load wheel connecting portions of the vehicle, a rotor frame extending in an outer side of a radial direction of the rotor at a position apart from the brake caliper in a condition that the rotor connecting portion is connected with each of the load wheel connecting portions, and a rotor peripheral wall extending in the inner side of the y-axis direction from a connecting portion at an end of the outer side in the radial direction of the rotor frame, and wherein the brake caliper is inserted into a space positioned at the inner side of the radial direction of the rotor inner wall in a condition that the rotor connecting portion is connected with each of the load wheel connecting portions.

5. The chassis dynamometer apparatus as claimed in claim 4, wherein the first movable mount comprises a pair of the movable mounts disposed at a distance in the x-axis direction are mounted on the base, the second movable mount is connected with the pair of the movable mounts and bridges the pair of the movable mounts, and the spherical joint is connected with the second movable mount between the pair of the movable mounts and protrudes downward from the second movable mount, wherein the spherical joint contains an inner cylinder having a spherical outer face, a collar having a spherical inner face coming into contact with the spherical outer face of the inner cylinder and slidably supporting the inner cylinder inside, and an outer cylinder supporting the collar by fitting the collar inside and being fixed to a lower face of the second movable mount, and wherein a projection protruding downward from the mounting frame is fixed to the inner cylinder by fitting the inner cylinder inside through a window hole opened at the second movable mount.

6. The chassis dynamometer apparatus as claimed in claim 4, the mounting frame is provided directly under each of the load motors.

* * * * *